United States Patent
Lander et al.

(10) Patent No.: US 9,017,566 B2
(45) Date of Patent: *Apr. 28, 2015

(54) ANTI-GLARE SURFACE TREATMENT METHOD AND ARTICLES THEREOF

(75) Inventors: Charles Warren Lander, Wayland, NY (US); Timothy Edward Myers, Painted Post, NY (US); Kelvin Nguyen, Corning, NY (US); Alan Thomas Stephens, II, Beaver Damns, NY (US)

(73) Assignee: Corning Incorporated, Corning, NY (US)

( * ) Notice: Subject to any disclaimer, the term of this patent is extended or adjusted under 35 U.S.C. 154(b) by 865 days.

This patent is subject to a terminal disclaimer.

(21) Appl. No.: 13/270,345

(22) Filed: Oct. 11, 2011

(65) Prior Publication Data

US 2012/0134024 A1 May 31, 2012

Related U.S. Application Data

(60) Provisional application No. 61/417,674, filed on Nov. 29, 2010.

(51) Int. Cl.
  *C03C 15/00* (2006.01)
  *G02B 5/02* (2006.01)
  *C03C 15/02* (2006.01)
  *C03C 17/00* (2006.01)

(52) U.S. Cl.
  CPC .............. *G02B 5/0226* (2013.01); *C03C 15/02* (2013.01); *C03C 15/00* (2013.01); *C03C 17/007* (2013.01); *C03C 2217/42* (2013.01); *C03C 2217/732* (2013.01); *C03C 2217/77* (2013.01); *C03C 2218/355* (2013.01); *G02B 5/0268* (2013.01); *G02B 5/0294* (2013.01)

(58) Field of Classification Search
  CPC ........ C03C 15/00; C03C 15/02; C03C 17/007
  USPC .................... 216/42, 49, 55, 80, 97
  See application file for complete search history.

(56) References Cited

U.S. PATENT DOCUMENTS

| 4,921,626 A | 5/1990 | Rhodenbaugh | 252/79.4 |
| 5,989,450 A | 11/1999 | Kim | 252/79.4 |

(Continued)

FOREIGN PATENT DOCUMENTS

| WO | 02/053508 | 7/2002 |
| WO | 2011/137141 | 11/2011 |
| WO | WO2013/066850 | 5/2013 |

OTHER PUBLICATIONS

Wikipedia, The Free Encyclopedia, "Polystyrene"; http://en.wikipedia.org/wiki/Polystyrene; pp. 1-14; 2014.*

(Continued)

*Primary Examiner* — Binh X Tran
(74) *Attorney, Agent, or Firm* — John L. Haack

(57) ABSTRACT

A glass article including: at least one anti-glare surface having haze, distinctness-of-image, surface roughness, and uniformity properties, as defined herein. A method of making the glass article includes, for example: depositing deformable particles on at least a portion of a glass surface of the article; causing the deposited deformable particles on the surface to deform and adhere to the surface; and contacting the surface having the adhered particles with an etchant to form the anti-glare surface. A display system that incorporates the glass article, as defined herein, is also disclosed.

11 Claims, 8 Drawing Sheets

(56) References Cited

U.S. PATENT DOCUMENTS

| | | | |
|---|---|---|---|
| 6,807,824 B1 | 10/2004 | Miwa | 65/31 |
| 2004/0195201 A1 | 10/2004 | Chao et al. | |
| 2008/0130123 A1* | 6/2008 | Namioka et al. | 359/613 |
| 2008/0142477 A1 | 6/2008 | Jacobs | |
| 2009/0041984 A1* | 2/2009 | Mayers et al. | 428/141 |
| 2009/0071537 A1 | 3/2009 | Yavuzcetin et al. | |
| 2009/0176015 A1* | 7/2009 | Nakanishi et al. | 427/162 |
| 2010/0245722 A1* | 9/2010 | Yoneyama et al. | 349/84 |
| 2010/0246016 A1 | 9/2010 | Carlson et al. | |
| 2011/0177241 A1* | 7/2011 | Lee et al. | 427/165 |
| 2012/0225517 A1* | 9/2012 | Zhang et al. | 438/71 |
| 2013/0323468 A1* | 12/2013 | Myers et al. | 428/143 |

OTHER PUBLICATIONS

Lin et al.; "Fast Nano-Scale Texturing Using the Self-Assembly Polymer Mask and Wet Chemical Etching"; Conference Reocrd of the IEEE Photovoltaic Specialists Conference—2009, pp. 1-5.

PCT Search Report and Written Opinion issued on May 14, 2012 in corresponding PCT Application No. PCT/US/11/61619, filed on Nov. 21, 2011.

* cited by examiner

4A

4B

ANTI-GLARE SURFACE TREATMENT METHOD AND ARTICLES THEREOF

CROSS-REFERENCE TO RELATED APPLICATION

This application claims the benefit of priority under 35 U.S.C. §119 of U.S. Provisional Application Ser. No. 61/417,674, filed on Nov. 29, 2010, the content of which is relied upon and incorporated herein by reference in its entirety.

CROSS-REFERENCE TO RELATED COPENDING APPLICATION(S)

This application is related to commonly owned and assigned U.S. Ser. No. 61/329,936, filed Apr. 30, 2010, entitled "Anti-Glare Surface Treatment Method and Articles Thereof," and U.S. Ser. No. 61/372,655 filed Aug. 11, 2010, entitled "Anti-Glare Surface Treatment Method and Articles Thereof."

BACKGROUND

The disclosure relates generally to methods of making and using an anti-glare surface and articles thereof.

SUMMARY

The disclosure provides a method of making an anti-glare surface, articles made by the method, and a display system incorporating the article having the anti-glare surface. In embodiments, the method of making includes depositing sacrificial deformable particles on at least one surface of an article, treating the deformable particle populated surface, i.e., particulated surface, to at least adhere the particles to the surface, and contacting the resulting adhered particulated surface with an etchant to form the anti-glare roughened surface.

BRIEF DESCRIPTION OF THE DRAWING(S)

In embodiments of the disclosure:

Figure 4:
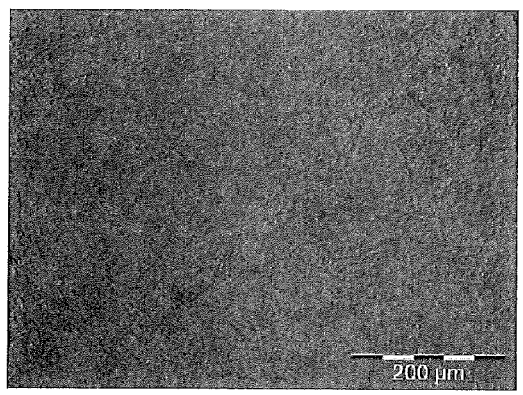
Figure 4:
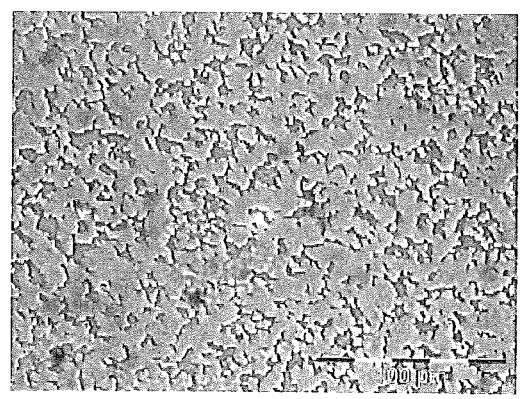

FIGS. 4A and 4B respectively show a microscopic image at two different magnifications of an example etched surface after the glass sample was slot-die coated with a polymer particle formulation and then thermally treated at 106° C. for 30 seconds.

Figure 5A:
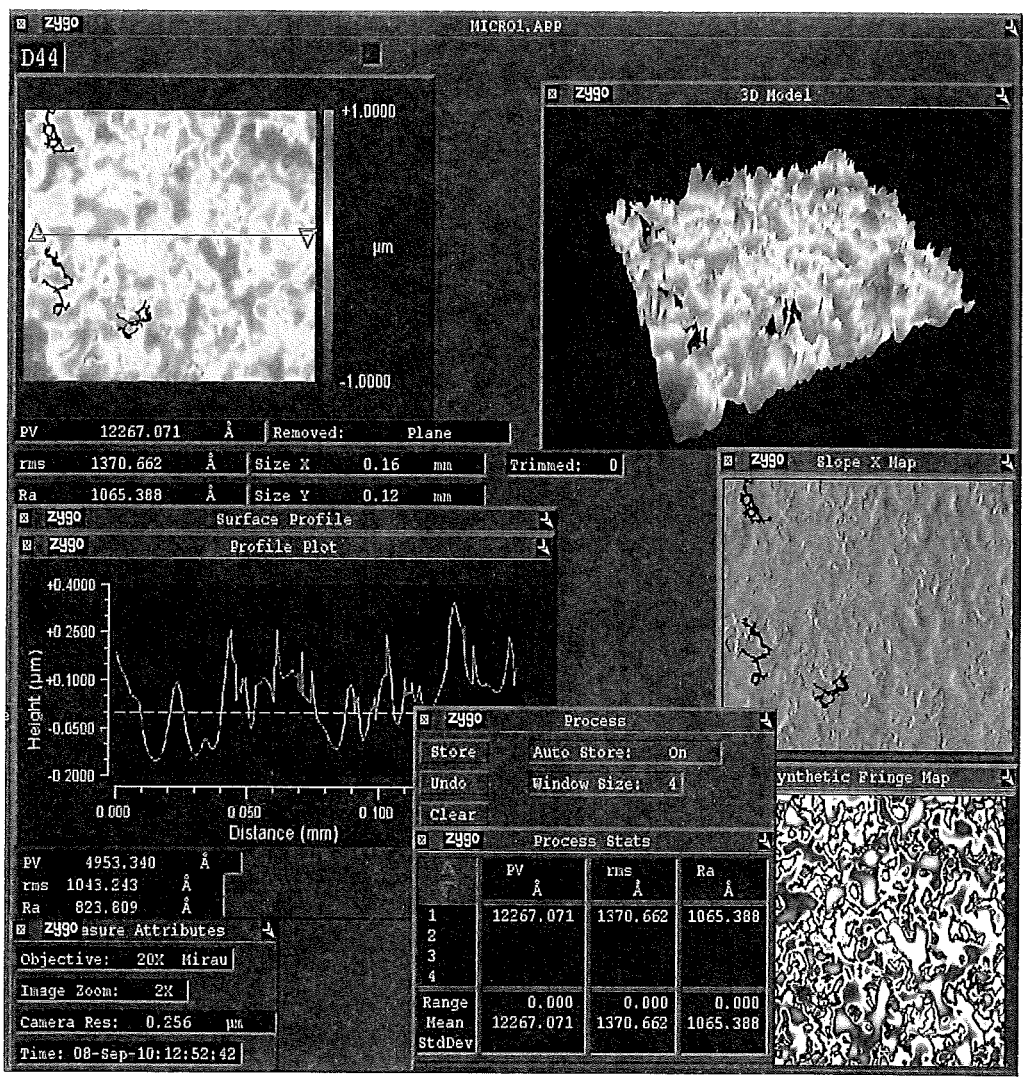
Figure 5B:
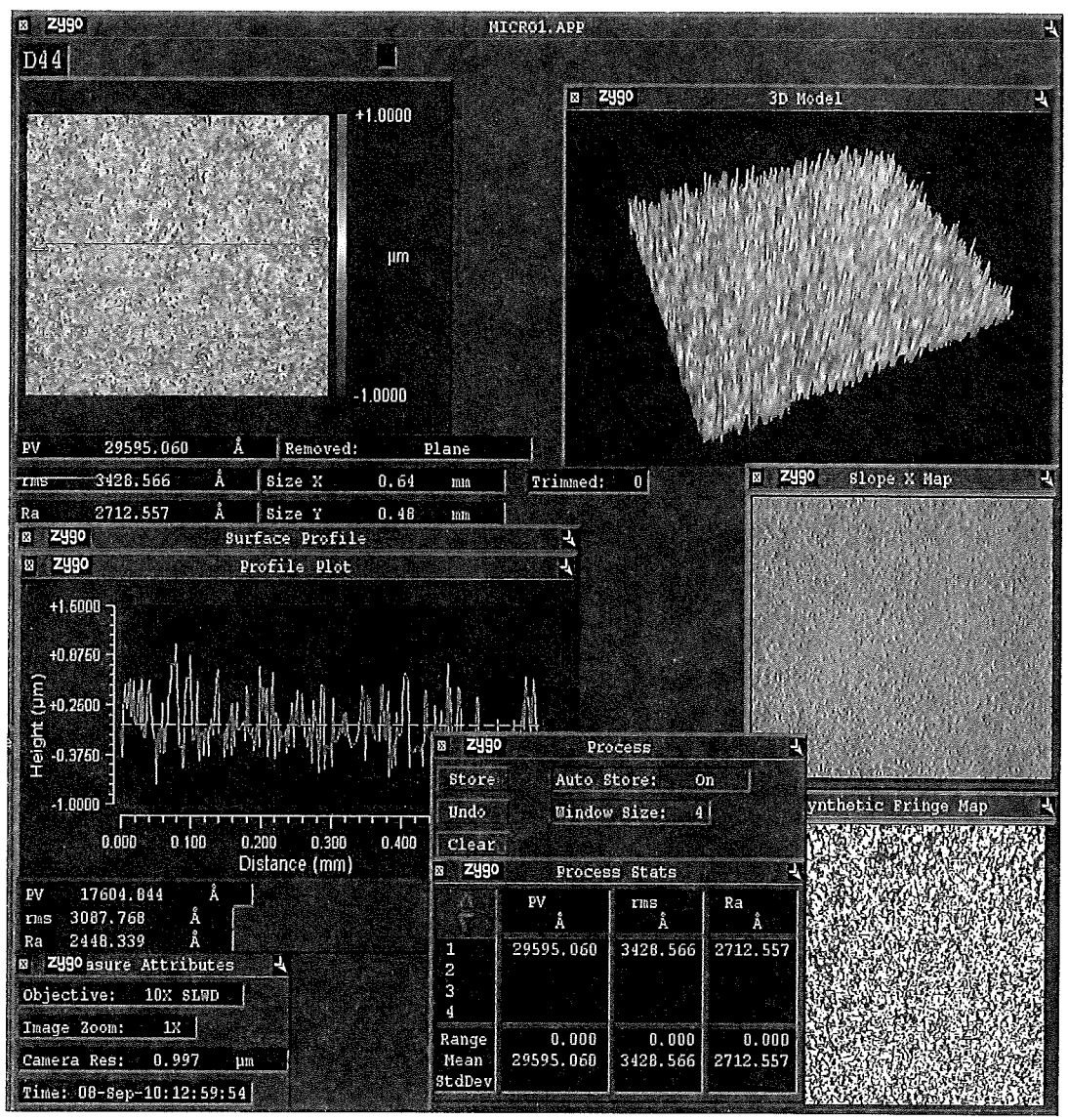

FIGS. 5A and 5B show, respectively, surface analysis images at high (FIG. 5A) and low (FIG. 5B) magnifications for surface roughness of an etched coupon after coating and thermal treatment at 106° C. for 30 seconds and then 30 seconds etch time.

Figure 6A:
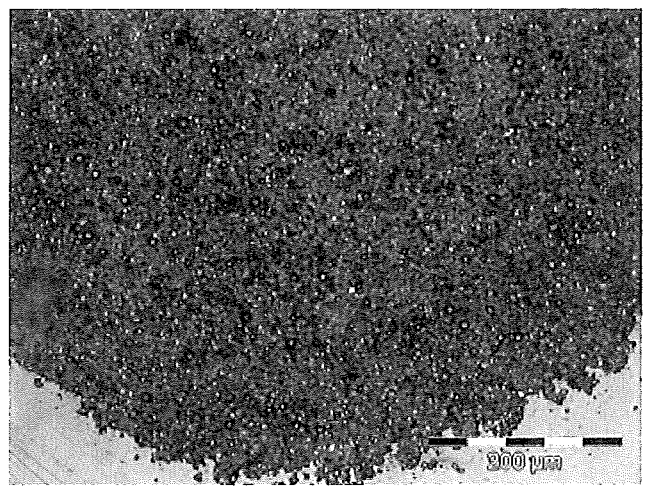
Figure 6B:
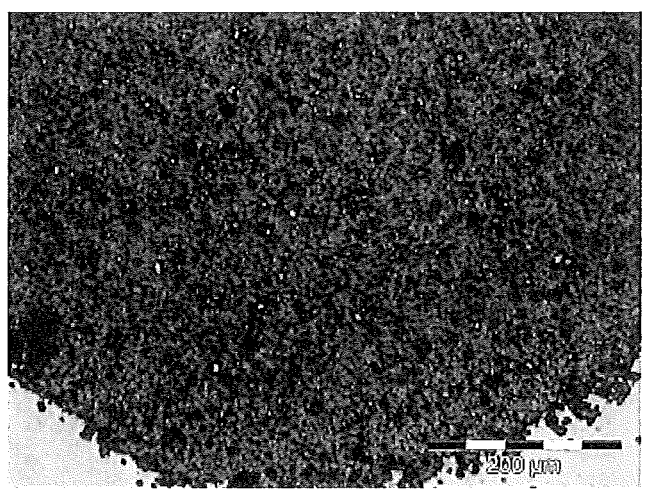

FIGS. 6A and 6B show, respectively, exemplary microscopic images of particles that were slot-die coated on a Gorilla® Glass surface, before and after they were thermally treated at 80° C. for 40 seconds.

Figure 7A:
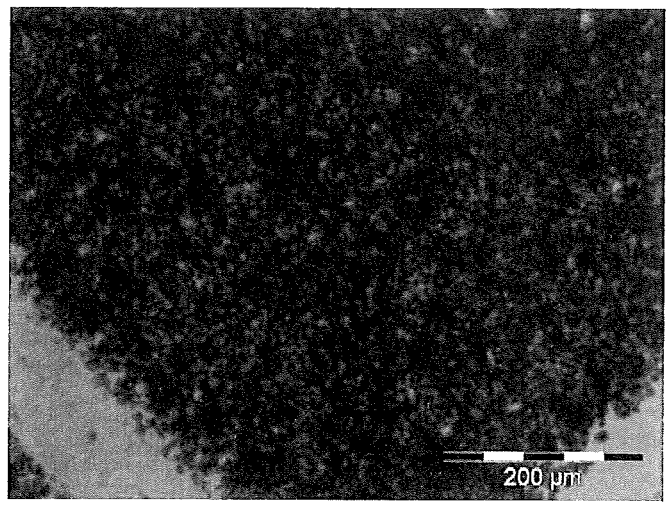
Figure 7B:
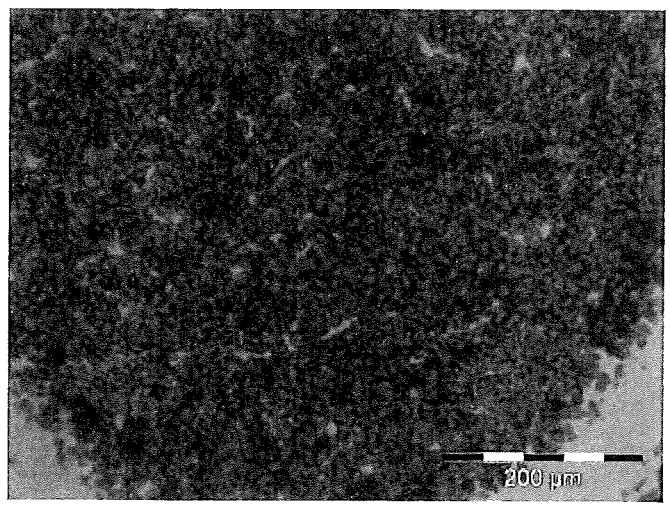

FIGS. 7A and 7B show, respectively, exemplary microscopic images of particles that were slot-die coated on a Gorilla® Glass surface, before and after they were thermally treated at 105° C. for 30 seconds.

Figure 8A:
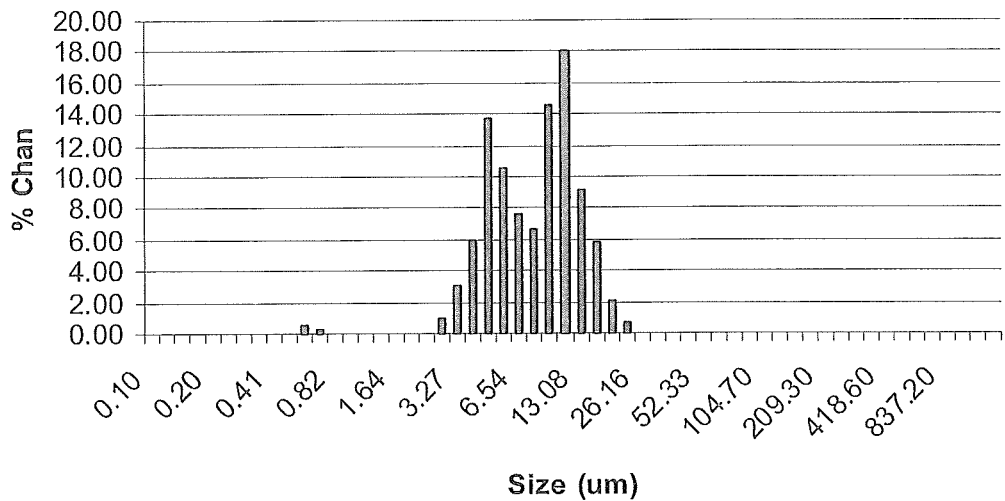
Figure 8B:
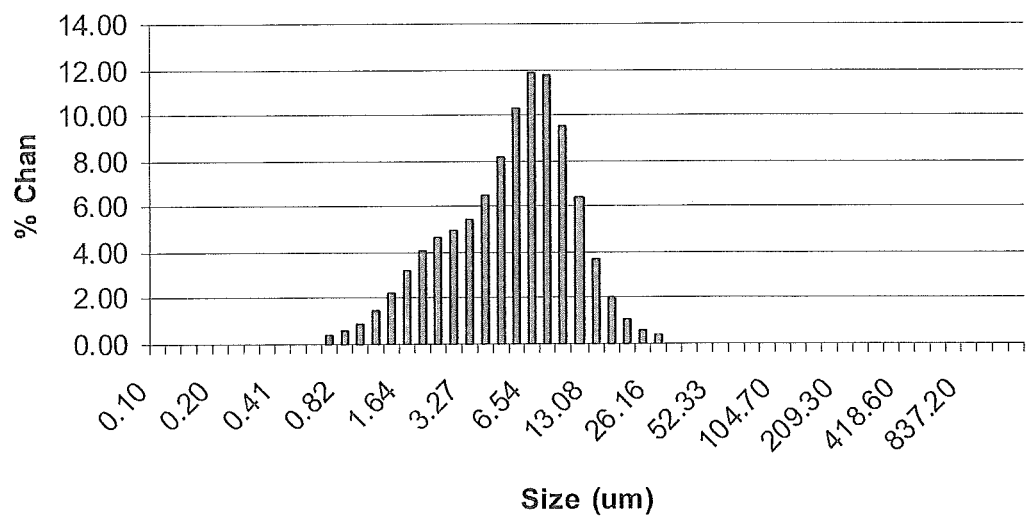

FIGS. 8A and 8B show histograms representing examples of the particle size distribution for exemplary particle suspension formulations measured by laser light scattering.

DETAILED DESCRIPTION

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

In embodiments, the disclosed articles, and the disclosed method of making and use provide one or more advantageous features or aspects, including for example as discussed below. Features or aspects recited in any of the claims are generally applicable to all facets of the invention. Any recited single or multiple feature or aspect in any one claim can be combined or permuted with any other recited feature or aspect in any other claim or claims.

DEFINITIONS

"Anti-glare" or like terms refer to a physical transformation of light contacting the treated surface of an article, such as a display, of the disclosure that changes, or to the property of changing light reflected from the surface of an article, into a diffuse reflection rather than a specular reflection. In embodiments, the surface treatment can be produced by mechanical, chemical, electrical, and like etching methods, or combinations thereof. Anti-glare does not reduce the amount of light reflected from the surface, but only changes the characteristics of the reflected light. An image reflected by an anti-glare surface has no sharp boundaries. In contrast to an anti-glare surface, an anti-reflective surface is typically a thin-film coating that reduces the reflection of light from a surface via the use of refractive-index variation and, in some instances, destructive interference techniques.

"Contacting" or like terms refer to a close physical touching that can result in a physical change, a chemical change, or both, to at least one touched entity. In the present disclosure various particulate deposition or contacting techniques, such as spray coating, dip coating, slot coating, and like techniques, can provide a particulated surface when contacted as illustrated and demonstrated herein. Additionally or alternatively, various chemical treatments of the particulated surface, such as spray, immersion, dipping, and like techniques, or combinations thereof, as illustrated and demonstrated herein, can provide an etched surface when contacted with one or more etchant compositions.

"Distinctness-of-reflected image," "distinctness-of-image," "DOI" or like term is defined by method A of ASTM procedure D5767 (ASTM 5767), entitled "Standard Test Methods for Instrumental Measurements of Distinctness-of-Image Gloss of Coating Surfaces." In accordance with method A of ASTM 5767, glass reflectance factor measurements are made on the at least one roughened surface of the glass article at the specular viewing angle and at an angle slightly off the specular viewing angle. The values obtained from these measurements are combined to provide a DOI value. In particular, DOI is calculated according to equation (1):

$$DOI = \left[1 - \frac{Ros}{Rs}\right] \times 100 \qquad (1)$$

where Rs is the relative amplitude of reflectance in the specular direction and Ros is the relative amplitude of reflectance in an off-specular direction. As described herein, Ros, unless otherwise specified, is calculated by averaging the reflectance over an angular range from 0.2° to 0.4° away from the specular direction. Rs can be calculated by averaging the reflectance over an angular range of ±0.05° centered on the specular direction. Both Rs and Ros were measured using a goniophotometer (Novo-gloss IQ, Rhopoint Instruments) that is calibrated to a certified black glass standard, as specified in ASTM procedures D523 and D5767. The Novo-gloss instrument uses a detector array in which the specular angle is centered about the highest value in the detector array. DOI was also evaluated using 1-side (black absorber coupled to rear of glass) and 2-side (reflections allowed from both glass surfaces, nothing coupled to glass) methods. The 1-side measurement allows the gloss, reflectance, and DOI to be determined for a single surface (e.g., a single roughened surface) of the glass article, whereas the 2-side measurement enables gloss, reflectance, and DOI to be determined for the glass article as a whole. The Ros/Rs ratio can be calculated from the average values obtained for Rs and Ros as described above. "20° DOI," or "DOI 20°" refers to DOI measurements in which the light is incident on the sample at 20° off the normal to the glass surface, as described in ASTM D5767. The measurement of either DOI or common gloss using the 2-side method can best be performed in a dark room or enclosure so that the measured value of these properties is zero when the sample is absent.

For anti-glare surfaces, it is generally desirable that DOI be relatively low and the reflectance ratio (Ros/Rs) of eq. (1) be relatively high. This results in visual perception of a blurred or indistinct reflected image. In embodiments, the at least one roughened surface of the glass article has a Ros/Rs greater than about 0.1, greater than about 0.4, and, greater than about 0.8, when measured at an angle of 20° from the specular direction using the 1-side method measurement. Using the 2-side method, the Ros/Rs of the glass article at a 20° angle from the specular direction is greater than about 0.05. In embodiments, the Ros/Rs measured by the 2-side method for the glass article is greater than about 0.2, and greater than about 0.4. Common gloss, as measured by ASTM D523, is insufficient to distinguish surfaces with a strong specular reflection component (distinct reflected image) from those with a weak specular component (blurred reflected image). This can be attributable to the small-angle scattering effects that are not measurable using common gloss meters designed according to ASTM D523.

"Transmission haze," "haze," or like terms refer to a particular surface light scatter characteristic related to surface roughness. Haze measurement is specified in greater detail below.

"Roughness," "surface roughness (Ra)," or like terms refer to, on a microscopic level or below, an uneven or irregular surface condition, such as an average root mean squared (RMS) roughness or RMS roughness described below.

"Gloss," "gloss level," or like terms refer to, for example, surface luster, brightness, or shine, and more particularly to the measurement of specular reflectance calibrated to a standard (such as, for example, a certified black glass standard) in accordance with ASTM procedure D523, the contents of which are incorporated herein by reference in their entirety. Common gloss measurements are typically performed at incident light angles of 20°, 60°, and 85°, with the most commonly used gloss measurement being performed at 60°. Due to the wide acceptance angle of this measurement, however, common gloss often cannot distinguish between surfaces having high and low distinctness-of-reflected-image (DOI) values. The anti-glare surface of the glass article has a gloss (i.e.; the amount of light that is specularly reflected from sample relative to a standard at a specific angle) of up to 90 SGU (standard gloss units), as measured according to ASTM standard D523, and, in one embodiment, has a gloss in a range from about 60 SGU up to about 80 SGU. See also the DOI definition above.

"Adhere," "adhering," "anneal," "annealing," or like terms individually or collectively refer to the state or action of the deposited particles when caused to deform and subsequently further hold fast, bind to, stick to, and like associative descriptors, to the glass surface being treated, including particle-surface attraction or association (adhesion), particle-particle attraction or association (cohesion), and like interactions.

"Deform," "deformable," "deforming," or like terms refer to the state or act of the deposited particles when caused to adhere to the glass surface by, for example, thermal, mechanical, radiation, or like means.

"ALF" or "average characteristic largest feature size" or like terms refer to a measure of surface feature variation in the x- and y-directions, i.e., in the plane of the substrate, as discussed further below.

"Sparkle," "display sparkle," or like terms refer to the relationship between the size of features on the at least one roughened glass surface and pixel pitch, particularly the smallest pixel pitch, is of interest. Display "sparkle" is commonly evaluated by human visual inspection of a material that is placed adjacent to a pixelated display. ALF and its relationship to display "sparkle" has been found to be a valid metric for different materials having different surface morphologies, including glasses of varying composition and particle-coated polymer materials. A strong correlation between average largest characteristic feature size (ALF) and visual ranking of display sparkle severity exists across multiple different sample materials and surface morphologies. In embodiments, the glass article can be a glass panel that forms a portion of a display system. The display system can include a pixelated image display panel that is disposed adjacent to the glass panel. The smallest pixel pitch of the display panel can be greater than ALF.

"Uniformity," "uniform" or like terms refer to the surface quality of an etched sample. Surface uniformity is commonly evaluated by human visual inspection at various angles. For example, the glass article sample is held at about eye level, and then slowly turned from 0 to 90 deg., under a standard, white fluorescent light condition. When no pin-holes, cracks, waviness, roughness, or other like defects can be detected by the observer, the surface quality is deemed "uniform"; otherwise, the sample is deemed not uniform. "Good" or "OK" ratings mean that the uniformity is acceptable or satisfactory with the former being subjectively better than the latter.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, and like values, and ranges thereof, employed in describing the embodiments of the disclosure, refers to variation in the numerical quantity that can occur, for example: through typical measuring and handling procedures used for preparing materials, compositions, composites, concentrates, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture. The claims appended hereto include equivalents of these "about" quantities.

"Consisting essentially of" in embodiments can refer to, for example:

a method of making a glass article by depositing particles on a surface of the article; adhering the particles to a surface of the article; and contacting the particulated surface with an etchant, as defined herein; or a glass article having an anti-glare surface having haze, distinctness-of-image, surface roughness, and uniformity properties, as defined herein; or a display system that incorporates the glass article, as defined herein.

The method of making, the article, the display system, compositions, formulations, or any apparatus of the disclosure, can include the components or steps listed in the claim, plus other components or steps that do not materially affect the basic and novel properties of the compositions, articles, apparatus, or methods of making and use of the disclosure, such as particular reactants, particular additives or ingredients, a particular agent, a particular surface modifier or condition, or like structure, material, or process variable selected. Items that may materially affect the basic properties of the components or steps of the disclosure or that may impart undesirable characteristics to the present disclosure include, for example, a surface having objectionable high glare or high gloss properties, for example, having a haze, a distinctness-of-image, a surface roughness, a uniformity, or a combination thereof, that are beyond the values, including intermediate values and ranges, defined and specified herein.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "mL" for milliliters, and "rt" for room temperature, "nm" for nanometers, and like abbreviations).

Specific and preferred values disclosed for components, ingredients, additives, and like aspects, and ranges thereof, are for illustration only; they do not exclude other defined values or other values within defined ranges. The compositions, apparatus, and methods of the disclosure can include any value or any combination of the values, specific values, more specific values, and preferred values described herein.

Chemically strengthened glasses are used in many handheld and touch-sensitive devices as display windows and cover plates where resistance to mechanical damage can be significant to the visual appearance and functionality of the product. During chemical strengthening, larger alkali ions in a molten salt bath are exchanged for smaller mobile alkali ions located within a certain distance from the glass surface. The ion-exchange process places the surface of the glass in compression, allowing it to become more resistant to any mechanical damage it is commonly subjected to during use.

Reduction in the specular reflection, a significant factor in glare, from many display surfaces is often desired, especially by manufacturers whose products are designed for outdoor use where glare can be exacerbated by sunlight. One way to reduce the intensity of the specular reflection, quantified as gloss, is to roughen the glass surface or cover it with a textured film. The dimensions of the roughness or texture should be large enough to scatter visible light, producing a slightly hazy or matte surface, but not too large as to significantly affect the transparency of the glass. Textured or particle-containing polymer films can be used when maintaining the properties (e.g., scratch resistance) of the glass substrate are not important. While these films maybe cheap and easy to apply, they are subject to easy abrasion which can reduce the display functionality of the device. Another shortfall of using films or coatings is that they can interfere with the operation of, or diminish the performance of certain touch-sensitive devices. Another approach to roughening the glass surface is chemical etching. U.S. Pat. Nos. 4,921,626, 6,807,824, 5,989,450, and WO2002053508, mention glass etching compositions and methods of etching glass with the compositions. Wet etching is a method of generating an anti-glare surface on the glass while preserving its inherent mechanical surface properties. During this process, the glass surface is exposed to chemicals which degrade the surface to the correct roughness dimensions for the scattering of visible light. When micro-structural regions having differential solubility are present, such as in soda lime silicate glasses, a roughened surface can be formed by placing the glass in a (typically fluoride-ion containing) mineral acid solution. Such selective leaching or etching is generally ineffective at generating a uniform, anti-glare surface on other display glasses lacking such differentially soluble micro-structural regions, such as alkaline earth aluminosilicates and mixed alkali borosilicates, and for alkali and mixed alkali aluminosilicates containing, for example, lithium, sodium, potassium, and like compositions, or combinations thereof.

One result of roughening a glass surface is to create "sparkle," which is perceived as a grainy appearance. Sparkle is manifested by the appearance of bright and dark or colored spots at approximately the pixel-level size scale. The presence of sparkle reduces the viewability of pixilated displays, particularly under high ambient lighting conditions.

In embodiments, the disclosure provides a method of making an article having an anti-glare surface, comprising:

depositing deformable particles on at least one surface of the article;

causing the deposited deformable particles on the surface to deform and adhere to the surface; and contacting the surface having the deformed and adhered particles with an etchant to form the anti-glare surface.

In embodiments, the disclosure provides a method of making an article having an anti-glare surface, comprising:

depositing particles on at least one surface of an article;

deforming the deposited particles on the surface to adhere to the surface; and contacting the surface having the adhered particles with an etchant to form the anti-glare surface.

In embodiments, the disclosure provides a method of making an article having an anti-glare surface, comprising:

depositing particles on a portion of at least one glass surface of the article;

heating the particle surface to adhere the deposited particles to the glass surface; and contacting the glass surface having the adhered particles with an etchant to form the anti-glare surface.

In embodiments, the disclosure provides a method of making an article having an anti-glare surface, comprising:

depositing deformable particles on a portion of at least one glass surface of the article;

deforming the deposited deformable particles on the surface to adhere the particles to the glass surface; and contacting the glass surface having the adhered particles with an etchant to form the anti-glare surface.

In embodiments, the disclosure provides a method of making an article having an anti-glare surface, comprising:

depositing polymer particles on a portion of at least one glass surface of the article;

heating the polymer particle surface to adhere the deposited polymer particles to the glass surface; and contacting the glass surface having the adhered particles with an etchant to form the anti-glare surface.

In embodiments, the glass surface can be, for example, at least one of a soda lime silicate glass, an alkaline earth aluminosilicate glass, an alkali aluminosilicate glass, an alkali borosilicate glass, a boroaluminosilicate glass, or a combination thereof, the deformable particles can be, for example, at least one polymer, wax, or a combination thereof, and the etchant comprises at least one acid selected from HF, $H_2SO_4$, or a combination thereof. The polymer particles can include, for example, at least one of a polymer, a copolymer, polymeric nano-particles, cross-linked polymer particles, UV cured polymer particles, core-shell particles having a core polymer having a $T_g$ lower than the shell polymer $T_g$, a wax, or a combination thereof.

In embodiments, the deforming the deposited deformable particles can be accomplished, for example, by heating. The heating can be accomplished by any suitable means, such as thermal means, radiation means, pressure means, and like methods, or a combination thereof. Such heating means can include, for example, a heat gun, a hot gas knife, a convection oven, a heat lamp, a radiant heater, a press plate, a heated iron, and like means or a combination thereof.

In embodiments, the depositing deformable particles on at least a portion of at least one glass surface of the article can be accomplished, for example, by contacting the at least one glass surface with a suspension of wax particles, polymer particles, or a combination thereof. The contacting the at least one glass surface with a suspension of wax particles, polymer particles, or a combination thereof can be accomplished with, for example, a slot coater. In embodiments, the depositing can be accomplished, for example, free of a binder; a rheology modifier; or a combination thereof.

In embodiments, the deposited deformable particles can be, for example, a monolayer of particles, an ordered monolayer of particles, a bilayer of particles, an ordered bilayer of particles, and combinations thereof.

In embodiments, the contacting with an etchant can be accomplished by, for example, exposing the glass surface having the deposited deformable particles to the etchant for about 1 second to about 30 minutes.

In embodiments, the deposited particles can have a $D_{50}$ diameter of, for example, from about 1 to about 30 micrometers, including intermediate values and ranges.

In embodiments, the deposited particles can by polymer particles comprising, for example, a thermoplastic, a wax, or a combination thereof. In embodiments, the deposited particles have a glass transition temperature ($T_g$), for example, of from about 25 to about 95° C., about 25 to about 85° C., about 30 to about 80° C., about 35 to about 50° C., and like glass transition temperatures, including intermediate values and ranges.

In embodiments, depositing polymer particles, wax particles, or a mixture of polymer particles and wax particles on the surface of the article can be accomplished with a slot-die coater, and like coating apparatus and methods.

In embodiments, the deposited particles on the surface can be, for example, a mono-layer to a multi-layer having a wet thickness of, for example, from about 1 to about 200 micrometers, such as from about 2 to about 100 micrometers including intermediate values and ranges, and a dry thickness of, for example, from about 0.1 to about 50 micrometers, such as from about 1 to about 25 micrometers including intermediate values and ranges.

In embodiments, the method can further comprise treating the resulting roughened surface with a low-surface energy coating, for example, a fluorinated compound, to reduce wetting and permit easy clean-up.

In embodiments, the method can further comprise, after etching, washing the resulting anti-glare surface, chemically strengthening the anti-glare surface, or a combination thereof.

In embodiments, the method can further comprise, prior to etching, contacting at least another surface of the article with an optionally removable, etch-resistant protective layer.

In embodiments, the disclosure provides a glass article prepared by any of the aforementioned processes including combinations or permutations thereof.

In embodiments, the disclosure provides a glass article comprising:

at least one anti-glare surface having:
a haze of from about 0.1 to about 30;
a distinctness-of-image (DOI 20°) of from about 25 to about 85;
a surface roughness (Ra) of from about 50 to about 500 nm; and
an average roughness peak-to-valley difference profile of from about 0.1 to about 10 micrometers.

In embodiments, the glass article can have anti-glare surface having, for example, a distribution of topographic features having, for example, an average diameter of about 1 to about 100 micrometers. A preferred diameter for topographic features can be, for example, from about 0.1 to about 20 micrometers, including intermediate values and ranges.

In embodiments, the glass article can be, for example, a sheet of protective cover glass of a display device.

In embodiments, the disclosure provides a display system comprising, for example:

a glass panel having at least one roughened anti-glare surface prepared by any of the above mentioned methods having:
a haze of less than about 30;
a distinctness-of-image (DOI 20°) of about 25 to about 85;
a surface roughness (Ra) of about 50 to about 500 nm; and
an average roughness peak-to-valley difference profile of about 0.1 to about 10 micrometers; and
a pixelated image-display panel adjacent to the glass panel.

In embodiments, a preferred haze can be, for example, less than about 10, an even more preferred haze can be, for example, about 6 to about 9, and an even more preferred haze can be, for example, about 5 to about 6 or below, including intermediate values and ranges.

In embodiments, the disclosure provides a coating and a wet etching process to form a nano- to micro-scale textured surface on a glass surface, such as silicate glasses. In embodiments, the process involves coating, for example, low molecular weight polymer particles, wax particles, or combinations thereof, on the glass surface, followed by a thermal treatment at a relatively low temperature, for example, from about 30 to about 140° C., from about 35 to about 135° C., from about 40 to about 130° C., from about 45 to about 100° C., from about 50 to about 90° C., from about 55 to about 85° C., from about 60 to about 80° C., and like temperatures, including intermediate values and ranges, and for a sufficient time to promote deformation and adhesion of the particles onto the glass surface. The particulated surface is then etched, for example, in an HF, or multi-component acid solution. The etch solution creates preferential etching around deformed particles on the glass surface to form an AG roughened surface layer on the processed glass article.

A known etching process to produce an anti-glare layer on a glass surface can involve at least three baths. For example, the first bath can contain ammonium biflouride (ABF), for growing ABF crystals on the glass surface. The second bath can contain $H_2SO_4$ acid to remove the crystals. The third bath can be a mixture of $H_2SO_4$/HF to smooth the glass surface. Typical processing times, from start to finish for the three-bath process, can be for example, of about 60 about 80 minutes.

Corning, Inc., has developed an alternative process, as disclosed in commonly owned and assigned U.S. Ser. No. 61/329,936, which involves the use of a particle suspension. The particle suspension can be used to create a differential etching-mask when applied to the glass surface and followed by etching. This process is significantly faster, but is still more complex and costly compared to the presently disclosed process. The disclosed process can have significant benefits compared to the other processes including, for example, the following features.

The process reproducibly provides anti-glare glass sheets having significantly improved appearance properties including, for example, very low sparkle such as from about 4 to about 6 compared to sparkle such as about 7 to about 12 attainable from prior processes.

The haze characteristics of the glass article processed in accord with the disclosure can be adjustable from low to very high values. Low haze can be desirable for applications requiring high display contrast, while high haze can be useful for optical designs having scattering, such as edge illumination, or for aesthetic reasons such as reducing the "black hole" appearance of the display in the off state. The general preference for low versus high haze (and the acceptance of performance trade-offs) can be motivated by customer or end-user preferences, and their final application and use mode.

The disclosed process permits the surface roughness of one or both sides of the glass sheet to be adjusted over a spectrum of roughness values from low to very high values. Low roughness is generally used to create small-angle scattering, resulting in low DOI with low haze and corresponding high display contrast. However, high roughness can be desirable for some applications, such as in certain touch-sensitive display devices where a rough surface can provide a desirable "gliding feel" for the user's point-of-contact, such as finger, knuckle, toe, or nose. The effect of high roughness can also be useful in non-display applications, such as mouse pad surfaces. For these touch applications, it may also be desirable to post-treat the rough surface with a low-surface energy coating such as a fluorosilane. This can reduce surface friction, improve the "gliding feel" effect, and also make the surfaces less wettable by oil and water, and easier to clean.

The widely adjustable haze and roughness values could be achieved using short etch times, for example, about 30 seconds, and having very little glass thickness loss, for example, less than about 5 microns, relative to prior anti-glare processes.

The disclosed process can use lower acid concentrations or shorter etch times to achieve high haze and roughness values compared to the process described in the copending commonly owned and assigned U.S. Ser. No. 61/372,655 application The ability to adjust haze, DOI, roughness, or combinations thereof, through the particle annealing temperature provides new flexibility for using the same acid compositions for multiple haze levels, or alternatively, to reduce the acid concentration used to achieve a given haze level. The ability to control the glass surface profile through particle deformation prior to etching can be independent of the coating method (wet or dry).

The slot die coating process used to apply particles to the glass allows a very thin layer, for example, 1 to 2 layers, or in some instances less than a monolayer, of particles on the surface. This improves the ability of the acid to infiltrate the spaces in the mask, resulting more efficient etching, less acid consumption, and less particle consumption.

In the copending commonly owned and assigned U.S. Ser. No. 61/329,936 application, an anti-glare surface was created by suspending particles in a liquid vehicle with other components such as a rheology modifier, a deformer, a binder, etc., then applied, such as sprayed, onto the glass surface, followed by drying, and etching. The combination of particle binders, rheology modifier, and other components in the liquid add complexity and could compromise the strength of the acid, for example, weakening the acid by reacting with one or more of the other ingredients. The present disclosure can be accomplished without these additives, which can further simplify process complexity and reduce process costs.

In embodiments, the disclosure provides a wet etch method for generating an anti-glare surface on the glass while preserving its inherent mechanical surface properties. During this process, a particulated glass surface is exposed to chemicals which can degrade the surface to alter the surface roughness dimensions that are responsible for scattering visible light. When significant quantities of mobile alkali ions are present in the glass, such as in soda lime silicate glasses, a roughened surface can be formed by, for example, contacting the glass surface in an acid etchant solution, such as a solution containing fluoride ion.

In embodiments, the at least one surface of the article can be, for example, a glass, a composite, a ceramic, a plastic or resin based material, and like materials, or combinations thereof. In embodiments, the deposited deformable particles can be polymer particles and can additionally or alternately include, for example, any suitable low melting substance: a glass, a composite, a ceramic, a plastic or resin based material, a metal, a salt, a clay, a polymer, a copolymer, nanoparticles, cross-linked polymer particles, UV cured particles, wax particles, and like materials, or combinations thereof. In embodiments, the etchant can be comprised of at least one acid suitable for etching the surface beneath the deposited particles.

In embodiments, the glass surface can be selected from, for example, at least one aluminosilicate, aluminoborosilicate, soda lime, borosilicate, silica, and like glasses, or a combination thereof, and the etchant can comprise at least one acid selected from HF, $H_2SO_4$, or a combination thereof.

Additionally or alternatively, the contacting the at least one surface with particles can be accomplished with a concentrated particle suspension, or a particle suspension of intermediate concentration. The particle-surface contacting can preferably be accomplished using any suitable method, for example, slot-die coating, screen printing, knife over roll coating (gap coating), rod coating, spray coating, curtain coating, and like application methods, or a combination thereof. The deposited particles can have, for example, a $D_{50}$ diameter of from about 0.1 to about 30 micrometers, from about 1 to about 30 micrometers, and from about 1 to about 25 micrometers, including intermediate values and ranges. In embodiments, the particle size range can be, for example, from about 0.1 to about 50 micrometers, 1 to about 30 micrometers, 2 to about 20 micrometers, and like particle diameters, including intermediate values and ranges. In embodiments, the particle size properties can be, for example, monomodal, bimodal, tri-modal, and like modalities, including monodisperse, oligodisperse, polydisperse, and like particle sizes and particle properties, or combinations thereof.

In embodiments, the contacting of the particulated surface with an etchant can be accomplished by, for example, exposing the surface having the deposited particles to the etchant, for example, for from about 1 second to about 30 minutes, including intermediate values and ranges, such as about 10 seconds to about 10 minutes, about 20 seconds to about 1 minute, and like exposures or intervals In embodiments, the preparative method can optionally further include, for example, washing the resulting etched anti-glare surface, chemically strengthening the anti-glare surface, applying a functional coating or film (e.g., a light sensitive or polarizing film) or protective surface coating or film, and like coatings or films, or a combination thereof.

In embodiments, when a single-side acid-etch, or like modification is desired on a sheet of glass, one side of the glass can be protected from the etching solution. Protection can be achieved, for example, by applying an insoluble non-porous coating such as an acrylic wax, or a laminate film having an adhesive layer, for example, an acrylic, a silicone, and like adhesives materials, or combinations thereof. Coating application methods can include, for example, brushing, rolling, spraying, laminating, and like methods. The acid-etch exposed insoluble non-porous protective coating survives the etching process and can be readily removed after the etching. Removing the protective film from the surface of the article can be accomplished using any suitable method, such as contacting the protective film with a dissolving liquid, heating the film to liquefy and drain, and like methods and materials, or a combination thereof. Thus, the preparative method can optionally further include, prior to etching, contacting at least another surface, e.g., a second surface such as the backside of a glass sheet, of the article with an optionally removable, etch-resistant protective layer.

In embodiments, the disclosure provides an article prepared by any of the preparative processes disclosed herein, such as a glass article prepared by the above mentioned particle deposition, particle deformation, particle surface adherence, and etching steps. In embodiments, the preparative processes can be accomplished sequentially, simultaneously, continuously, semi-continuously, batch-wise, and like permutations, or combinations thereof.

In embodiments, the at least one surface of the article can be a glass, the deposited particles can be a wax, and the etchant can be at least one acid.

In embodiments, the disclosure provides a glass article comprising:
at least one anti-glare surface having:
  a haze of, for example, from about 0.1 to about 30, such as from about 0.1 to about 25, from about 0.1 to about 20, from about 0.1 to about 10, and from about 1 to about 10, and low haze, such as from about 0.1 to about 5, and from about 1 to about 5, including intermediate values and ranges;
  a distinctness-of-image (DOI 20°) of, for example, from about 25 to about 85, from about 40 to about 80, from about 45 to about 75, and from about 50 to about 70, including intermediate values and ranges;
  a surface roughness (Ra) of, for example, from about 50 to about 500 nm, and from about 80 to about 300 nm, including intermediate values and ranges; and
  an average roughness peak-to-valley profile of from about 0.1 to about 10 micrometers, including intermediate values and ranges.

In embodiments, the glass article having anti-glare surface of the disclosure can comprise a distribution of topographic features having an average diameter of about 0.1 to about 100 micrometers, about 0.1 to about 50 micrometers, about 0.1 to about 30 micrometers, and like ranges, including intermediate values and ranges.

In embodiments, the disclosure provides a display system including, for example:
a glass panel having at least one roughened anti-glare surface having:
  a haze of from about 0.1 to less than about 30 including intermediate values and ranges;
  a distinctness-of-image (DOI 20°) of from about 40 to about 80, including intermediate values and ranges;
  a surface roughness (Ra) of from about 100 to about 300 nm, including intermediate values and ranges; and
  an average roughness peak-to-valley difference profile of from about 0.1 to about 10 micrometers, including intermediate values and ranges; and
a pixelated image-display panel adjacent to the glass panel.

In embodiments, the disclosure provides a wet etch process to form a uniform, nano- to micro-scale textured surface on most silicate glasses and without having a significant impact on chemical strengthening capability of the glass. The process includes depositing or otherwise coating deformable particles, such as polymer, glass, or composite particles, on the glass surface, followed by particle deformation or surface adherence, and acid etching of the particulated surface, such as in an HF, or multi-component acid solution. In embodiments, the HF solution can preferentially etch around the adhered or annealed particles on the glass surface, then can optionally, depending upon conditions and duration, subsequently erode the adhered or annealed particles from the etched surface, and can also reduce the surface roughness.

In embodiments, the desired reduced gloss or glare levels can be obtained, for example, by adjusting at least one or more of the following parameters: the viscosity of the particulate suspension, the level or concentration of the particles in the suspension, the concentration of the acid etchant, the amount of particles deposited on the surface, the particle size distribution (PDS) of the particles used, and the exposure interval or the time that the particle-bearing surface of the glass sample is in contact with the acid etchant. In embodiments, the masked surface can be etched, the masked surface can be removed, and the unmasked etched surface can be etched one or more times, to for example provide at least some smoothing of the unmasked etched surface.

In embodiments, an anti-glare glass article is provided. The glass article can be ion-exchangeable and can have at least one roughened surface. The roughened surface has a distinctness-of-reflected image (DOI) of less than 90 when measured at an incidence angle of 20° (DOI at 20°). A pixelated display system that includes the anti-glare glass article is also provided. The glass article can be, for example, a planar sheet or panel having two major surfaces joined on the periphery by at least one edge, although the glass article can be formed into other shapes such as, for example, a three-dimensional shape. At least one of the surfaces is a roughened surface including, for example, topological or morphological features, such as, projections, protrusions, depressions, pits, closed or open cell structures, particles, islands, lands, trenches, fissures, crevices, and like geometries and features, or combinations thereof.

In embodiments, the disclosure provides an aluminosilicate glass article. The aluminosilicate glass article can include, for example, at least 2 mol % $Al_2O_3$, can be ion-exchangeable, and can have at least one roughened surface. The aluminosilicate glass article can have at least one roughened surface comprising a plurality of topographical features. The plurality of topographical features can have an average characteristic largest feature size (ALF) of from about 1 micrometer to about 50 micrometers.

In embodiments, the disclosure provides a display system. The display system can include, for example, at least one glass panel and a pixelated image-display panel adjacent to the glass panel. The image-display panel can have a minimum native pixel pitch dimension. The average characteristic largest feature size (ALF) of the glass panel can be less than the minimum native pixel pitch dimension of the display panel. The pixelated image display panel can be, for example, one of an LCD display, an OLED display, or like display devices. The display system can also include touch-sensitive elements or surfaces. The glass can be, for example, any of the aforementioned glasses, such as an aluminosilicate ion-exchanged glass that has at least one roughened surface including a plurality of features having an ALF, and the image-displaying panel has a minimum native pixel pitch. The minimum native pixel pitch can be, for example, greater than the ALF of the roughened surface of the glass panel.

ALF is measured in the plane of (i.e., parallel to) the roughened glass surface, and is therefore independent of roughness. ALF is a measurement of feature variation in the x- and y-directions, i.e., in the plane of the roughened glass surface. Selecting the largest characteristic features is a useful distinction from other methods that determine a more global average feature size. The largest features are most easily seen by the human eye and are therefore most important in determining visual acceptance of the glass article. In embodiments, the topological or morphological features of the at least one roughened surface has an average characteristic largest feature (ALF) size of from about 1 micrometer to about 50 micrometers, of from about 5 micrometers to about 40 micrometers; of from about 10 micrometers to about 30 micrometers; and from about 14 micrometers to about 28 micrometers, including intermediate values and ranges. The average characteristic largest feature size is the average cross-sectional linear dimension of the twenty largest repeating features within a viewing field on a roughened surface. A standard calibrated optical light microscope can typically be used to measure feature size. The viewing field is proportional to the feature size, and typically has an area of approximately 30(ALF)×30(ALF). If, for example, the ALF is approximately 10 micrometers, then the viewing field from which the twenty largest features are selected is approximately 300 micrometers×300 micrometers. Small changes in the size of the viewing field do not significantly affect ALF. The standard deviation of the twenty largest features that are used to determine ALF should generally be less than about 40% of the average value, i.e., major outliers should be ignored since these are not considered "characteristic" features.

The topography of the anti-glare surface can include, for example, features such as protrusions or projections, depressions, and like features having a maximum dimension of less than about 400 nm. In embodiments, these topographical features can be separated from each other or spaced apart at a mean distance of from about 10 nm up to about 200 nm. The resulting anti-glare surface can have an average roughness, as measured by the peak-to-valley difference (PV) measure on the surface. In embodiments, the anti-glare surface can have a RMS roughness of about 800 nm, of about 500 nm, and about 100 nm.

The features used to calculate ALF are "characteristic;" i.e., at least twenty similar features can be located in the proportional viewing field. Different morphologies or surface structures can be characterized using ALF. For example, one surface structure may appear to be closed-cell repeating structures, another may appear to be small pits separated by large plateaus, and a third may appear to be a field of small particles punctuated by intermittent large smooth regions. In each instance, the ALF is determined by measuring the twenty largest repeating surface regions that are substantially optically smooth. In the instance of the repeating closed cell surface structure, the features to be measured are the largest of the cells in the closed-cell matrix. For the surface structure comprising small pits separated by large plateaus, the large plateaus between pits are to be measured. For the surface comprising a field of small particles punctuated by intermittent large smooth regions, the intermittent large smooth regions are to be measured. All surfaces with substantially varying morphologies can thus be characterized using ALF.

In embodiments, the at least one roughened surface of the glass article has an average RMS roughness can be from about 10 nm to about 800 nm, from about 40 nm to about 500 nm, and from about 40 nm to about 300 nm. In embodiments, the average RMS roughness can be greater than about 10 nm and less than about 10% of the ALF, greater than about 10 nm and less than about 5% of ALF, and greater than about 10 nm and less than about 3% of ALF.

The specification of low DOI and high Ros/Rs provide constraints on the characteristic feature size and ALF. For a given roughness level, it has been found that larger feature sizes result in lower DOI and higher Ros/Rs. Therefore, to balance the display sparkle and the DOI target, in embodiments, it can be desirable to create anti-glare surfaces having an intermediate characteristic feature size that is neither too small nor too large. It is also desirable to minimize reflected or transmitted haze when the transmitted haze is scattering into very high angles that can cause a milky white appearance of a roughened article under ambient lighting.

"Transmission haze," "haze," or like terms refer to the percentage of transmitted light scattered outside an angular cone of ±4.0° according to ASTM D1003. For an optically smooth surface, the transmission haze is generally close to zero. Transmission haze of a glass sheet roughened on two sides ($Haze_{2-side}$) can be related to the transmission haze of a glass sheet having an equivalent surface that is roughened on only one side ($Haze_{1-side}$), according to the approximation of eq. (2):

$$Haze_{2-side} \approx [(1-Haze_{1-side}) \cdot Haze_{1-side}] + Haze_{1-side} \quad (2).$$

Haze values are usually reported in terms of percent haze. The value of $Haze_{2-side}$ from eq. (2) must be multiplied by 100. In embodiments, the disclosed glass article can have a transmission haze of less than about 50% and even less than about 30%.

A multistep surface treatment process has been used to form the roughened glass surface. An example of a multistep etch process is disclosed in commonly owned copending U.S. Provisional Patent Appln 61/165,154, filed Mar. 31, 2009, to Carlson, et al., entitled "Glass Having Anti-Glare Surface and Method of Making," where a glass surface is treated with a first etchant to form crystals on the surface, then etching a region of the surface adjacent to each of the crystals to a desired roughness, followed by removing the crystals from the glass surface, and reducing the roughness of the surface of the glass article to provide the surface with a desired haze and gloss.

In embodiments, various performance enhancing additives can be included in the particle suspension, the etch solution, or both, including for example, a surfactant, a co-solvent, a diluent, a lubricant, a gelation agent, and like additives, or combinations thereof.

The contacting the particulated surface with an etchant can involve, for example, selective partial or complete dipping, spaying, immersion, and like treatments, or a combination of treatments, with an acidic etch solution including, for example, 2 to 10 wt % hydrofluoric acid and 2 to 30 wt % of a mineral acid, such as hydrochloric acid, sulfuric acid, nitric acid, phosphoric acid, and like acids, or combinations thereof. The glass surface can be etched in the solution for periods of from about 1 second to about 10 minutes, including intermediate values and ranges, with longer times generally leading to a greater reduction in the surface roughness. The disclosed concentrations and etch times are representative of suitable examples. Concentrations and etch times outside the disclosed ranges can also be used to obtain the roughened surface of the glass article albeit potentially less efficiently. Other etch concentrations can be, for example, 3M HF/3.6 M $H_2SO_4$, 5.5M HF/6.5M $H_2SO_4$, 6M HF/7 M $H_2SO_4$, and like etch concentrations and compositions, including intermediate values and ranges.

In chemical strengthening, larger alkali metal ions are exchanged for smaller mobile alkali ions near the glass surface. This ion-exchange process places the surface of the glass in compression, allowing it to be more resistant to any mechanical damage. In embodiments, the outer surface of the glass article can optionally be ion-exchanged where smaller metal ions are replaced or exchanged by larger metal ions having the same valence as the smaller ions. For example, sodium ions in the glass can be replaced with larger potassium ions by immersing the glass in a molten salt bath containing potassium ions. The replacement of smaller ions with larger ions creates a compressive stress within the layer. In embodiments, the larger ions near the outer surface of the glass can be replaced by smaller ions, for example, by heating the glass to a temperature above the strain point of the glass. Upon cooling to a temperature below the strain point, a compressive stress is created in an outer layer of the glass. Chemical strengthening of the glass can optionally be performed after the surface roughening treatment, with little negative effect on the ion-exchange behavior or the strength of the glass article.

In embodiments, the disclosure provides a method for making an anti-glare surface including, for example, "particulating" (i.e., populating) the surface with particles, such as with a liquid suspension or a soot gun, deforming or adhering the particulates to the surface, etching the adhered particulated surface with a suitable etchant, ion-exchanging the etched surface, and optionally accomplishing further processing to reduce objectionable surface flaws (i.e., flaw reduction). Alternatively or additionally, the surface can be ion-exchanged, particulated with particles, particles adhered to the surface, etched with an etchant, and optionally flaw reduction processed.

Figure 1:
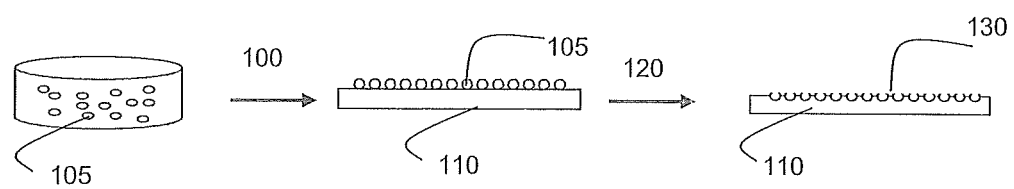
FIG. 1 shows a schematic of the method of making an anti-glare layer on a glass surface.

Referring to the figures, FIG. 1 schematically shows the steps in the process of creating an anti-glare layer on a GORILLA® glass surface. Wax particles, or like deformable particles, having an average particle size of from about 0.1 to about 20 micrometers are suspended in a suitable liquid such as isopropyl alcohol, and the resulting suspension can be deposited (100), for example, slot coated onto a glass substrate, and the solvent removed to leave a residual layer of wax particles (105) weakly adhered on the glass substrate (110). The sample can then be dipped into or immersed in an acid etch (120) bath. The $HF/H_2SO_4$ etchant attacks the area around the wax particles and eventually under-cuts the area covered by individual particles. The wax particles can be liberated from the substrate surface during or after a rinse step (120) to create a textured surface (130) on the glass substrate having anti-glare properties. FIG. 1 shows the general process of how the anti-glare layer is created on, for example, a Gorilla® Glass surface in using the slot-die process. The particles are first suspended in a liquid, such as isopropanol or like liquids, then the suspension is slot-die coated onto a glass substrate. The solvent can be removed by any suitable means, for example, evaporation, vacuum, hot air, and like means leaving a thin layer of particles on the glass surface. Removing the solvent with hot air or like means can be sufficient and efficient enough to adhere the deformable particles to the glass surface on a small, intermediate, or large scale. The sample can then, for example, be dipped into a $HF/H_2SO_4$ etchant bath. The acid attacks the area around the particles and eventually under cuts the area of some or all of the particles. Some or substantially all of the particles come off the glass surface during the rinsing to leave behind an etched surface to provide an anti-glare layer or anti-glare surface on the article.

Figure 2:
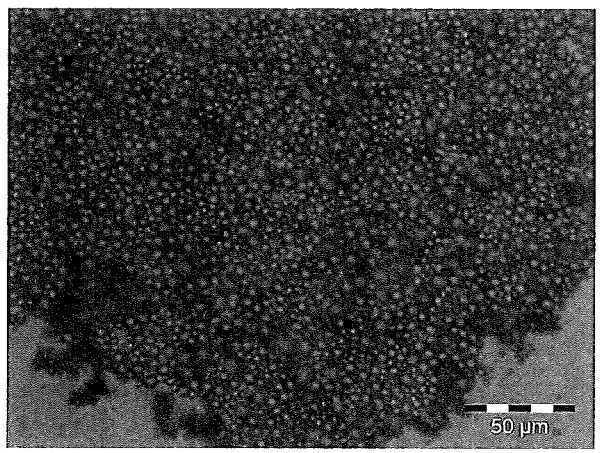
FIG. 2 shows an example microscopic image of wax particles that were slot-die coated on a Gorilla® Glass surface.

FIG. 2 shows an example microscopic image of the wax particles that were slot-die coated on a Gorilla® Glass surface. Numerous experiments demonstrated that the wax particles uniformly deposited on the glass surface providing tiny openings, voids, or interstices between the particles.

Figure 3:
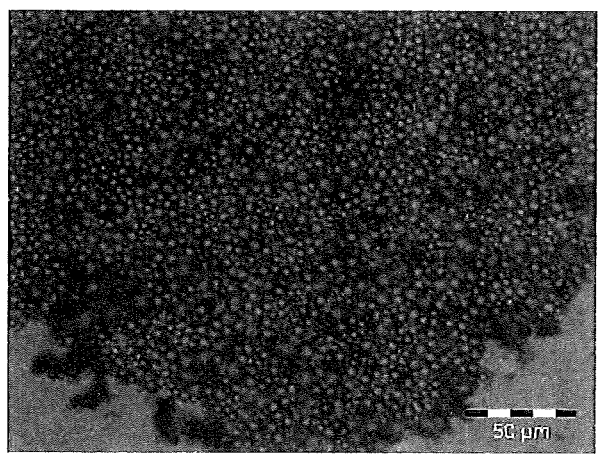
FIG. 3 shows an example microscopic image of the Gorilla® Glass surface of FIG. 2 that was subsequently thermally treated at 75° C. for 30 seconds.

FIG. 3 shows an example microscopic image of the Gorilla® Glass surface of FIG. 2 that was subsequently thermally treated at 75° C. for 60 seconds. The particles deformed and fused together and adhered well to the glass surface. Substantially greater numbers of micro-openings can be seen as the light shaded regions.

FIGS. 4A and 4B, respectively, show a microscopic image at two different magnifications of an example etched surface after the glass sample was slot-die coated with a wax particle formulation and then thermally treated (annealed) at 106° C. for 30 seconds. FIG. 4A shows a 200 micrometer scale and FIG. 4B shows a 100 micrometer scale. The etch solution used was 5.5M HF/6.5M $H_2SO_4$ and the sample was etched for 30 seconds. The measured optical properties of the resulting surface were: haze=39 and DOI=44, sparkle=5.1

FIGS. 5A and 5B, respectively, show surface analysis images at high (FIG. 5A) and low (FIG. 5B) magnifications for surface roughness of an etched coupon after coating and thermal treatment at 106° C. for 30 seconds and then 30 seconds etch time. The same area was captured with two different optical objectives (20× and 10×). The Ra=82 nm captured at 20×, 2× zoom, and Ra=245 nm captured at 10×, 1× zoom. The etched surface was obtained with "6/7" acid solution (i.e., acid molarity ratio of: 6 M HF/7M $H_2SO_4$) for 30 seconds.

FIGS. 6A and 6B show, respectively, exemplary microscopic images of particles that were slot-die coated on a Gorilla® Glass surface, before and after they were thermally treated at 75° C. for 30 seconds. The image location captured was at the same location in FIGS. 6A and 6B to show the surface before (FIG. 6A top) and after (FIG. 6B bottom) 30 seconds of wax particle surface with tiny openings after heat treatment at 75° C.

FIGS. 7A and 7B show, respectively, exemplary microscopic images of particles that were slot-die coated on a Gorilla® Glass surface, before and after they were thermally treated at 85° C. for 30 seconds. The image location captured was at the same location in both FIGS. 7A and 7B to show the surface appearance and condition before (7A, top) and after (7B, bottom) 30 seconds of particle surface deformation by heating at 115° C.

FIG. 8A shows a histogram representing an example of the particle size distribution for an exemplary particle suspension formulation of Example 1 measured by laser light scattering. FIG. 8B shows a histogram representing another example of a particle size distribution for an exemplary monomodal particle suspension formulation consisting of DEUREX MM 8015 wax particles. The "% CHAN" refers to the relative number percentage of the particle size distribution within an average particle size channel or bin, for example, 6.0+/−0.5 micrometers. The polymer particle distribution profile has bimodal character substantially between about 2 and 20 microns and centered around a particle size of about 8 to 10 microns. Other suitable particle sizes can be, for example, 0.5 micrometers to about 20 microns, including intermediate values and ranges. Using particle sizes greater than about 20 microns can result in the etched surface having increased sparkle.

The disclosed etch method can be accomplished quickly, for example, in from about 1 second to about 10 minutes, from about 1 second to about 5 minutes, including intermediate values and ranges, such as in from about 2 second to about 4 minutes, to create an anti-glare layer on a glass surface. A conventional multi-bath method can take about 60 minutes or more. The disclosed etch method uses a single chemical etchant bath (e.g., HF and $H_2SO_4$) instead of three or more baths used in conventional processes.

In embodiments, the disclosed method can etch away, for example, from about 1 to about 50 micrometers of the substrate being etched (i.e., into the plane of the substrate or the z-direction), from about 1 to about 30 micrometers of the substrate, from about 1 to about 20 micrometers of the substrate, from about 1 to about 10 micrometers of the substrate, including intermediate values and ranges, to create a desired anti-glare layer. In contrast, a conventional etch process can typically remove about 100 to about 200 micrometers of the glass surface. Since relatively little glass is lost from the glass substrate using the disclosed method, the glass can have a maximum warp of less than about 250 micrometers. A conventional glass etching process can produce glass surfaces having, for example, about 300 micrometers or more of warp.

Samples prepared with the disclosed process show similar optical properties (e.g., haze, gloss, and distinctness of image (DOI)) when compared with samples etched with a conventional process, but the present method and samples are advantaged by having substantial reductions in process time and costs. The disclosed process is readily scaled-up for large parts, such as a one square meter glass sheet, and above, while a conventional dip process is less readily scalable for larger units.

With a proper design selection, the disclosed process does not need backside protection to make single-sided samples. Single-sided samples can be prepared using for example, single-side dip, spray, screen printing, or spin coating methods. A multi-bath conventional process needs backside protection film, which can further increase manufacturing costs.

In embodiments, the glass article can comprise, consist essentially of, or consist of one of a soda lime silicate glass, an alkaline earth aluminosilicate glass, an alkali aluminosilicate glass, an alkali borosilicate glass, and combinations thereof. In embodiments, the glass article can be, for example, an alkali aluminosilicate glass having the composition: 60-72 mol % $SiO_2$; 9-16 mol % $Al_2O_3$; 5-12 mol % $B_2O_3$; 8-16 mol % $Na_2O$; and 0-4 mol % $K_2O$, wherein the ratio $$\frac{Al_2O_3(\text{mol \%}) + B_2O_3 \text{ (mol \%)}}{\sum \text{ alkali metal modifiers (mol \%)}} > 1,$$

where the alkali metal modifiers are alkali metal oxides. In embodiments, the alkali aluminosilicate glass substrate can be, for example: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % $MgO$; and 0-3 mol % $CaO$. In embodiments, the alkali aluminosilicate glass substrate can be, for example: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % $MgO$; 0-10 mol % $CaO$; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol %≤$Li_2O+Na_2O+K_2O$≤20 mol % and 0 mol %≤$MgO+CaO$≤10 mol %. In embodiments, the alkali aluminosilicate glass substrate can be, for example: 64-68 mol % $SiO_2$; 12-16 mol % $Na_2O$; 8-12 mol % $Al_2O_3$; 0-3 mol % $B_2O_3$; 2-5 mol % $K_2O$; 4-6 mol % $MgO$; and 0-5 mol % $CaO$, wherein: 66 mol %≤$SiO_2+B_2O_3+CaO$≤69 mol %; $Na_2O+K_2O+B_2O_3+MgO+CaO+SrO$>10 mol %; 5 mol % $MgO+CaO+SrO$≤8 mol %; $(Na_2O+B_2O_3)-Al_2O_3$≤2 mol %; 2 mol %≤$Na_2O-Al_2O_3$≤6 mol %; and 4 mol %≤$(Na_2O+K_2O)-Al_2O_3$≤10 mol %. In embodiments, the alkali aluminosilicate glass can be, for example: 50-80 wt % $SiO_2$; 2-20 wt % $Al_2O_3$; 0-15 wt % $B_2O_3$; 1-20 wt % $Na_2O$; 0-10 wt % $Li_2O$; 0-10 wt % $K_2O$; and 0-5 wt % $(MgO+CaO+SrO+BaO)$; 0-3 wt % $(SrO+BaO)$; and 0-5 wt % $(ZrO_2+TiO_2)$, wherein 0≤$(Li_2O+K_2O)/Na_2O$≤0.5.

In embodiments, the alkali aluminosilicate glass can be, for example, substantially free of lithium. In embodiments, the alkali aluminosilicate glass can be, for example, substantially free of at least one of arsenic, antimony, barium, or combinations thereof. In embodiments, the glass can optionally be batched with 0 to 2 mol % of at least one fining agent, such as $Na_2SO_4$, NaCl, NaF, NaBr, $K_2SO_4$, KCl, KF, KBr, $SnO_2$, at like substances, or combinations thereof.

In embodiments, the selected glass can be, for example, down drawable, i.e., formable by methods such as slot draw or fusion draw processes that are known in the art. In these instances, the glass can have a liquidus viscosity of at least 130 kpoise. Examples of alkali aluminosilicate glasses are described in commonly owned and assigned U.S. patent application Ser. No. 11/888,213, to Ellison, et al., entitled "Down-Drawable, Chemically Strengthened Glass for Cover Plate," filed Jul. 31, 2007, which claims priority from U.S. Provisional Application 60/930,808, filed May 22, 2007; U.S. patent application Ser. No. 12/277,573, to Dejneka, et al., entitled "Glasses Having Improved Toughness and Scratch Resistance," filed Nov. 25, 2008, which claims priority from U.S. Provisional Application 61/004,677, filed Nov. 29, 2007; U.S. patent application Ser. No. 12/392,577, to Dejneka, et al., entitled "Fining Agents for Silicate Glasses," filed Feb. 25, 2009, which claims priority from U.S. Provisional Application No. 61/067,130, filed Feb. 26, 2008; U.S. patent application Ser. No. 12/393,241, to Dejneka, et al., entitled "Ion-Exchanged, Fast Cooled Glasses," filed Feb. 26, 2009, which claims priority to U.S. Provisional Application No. 61/067,732, filed Feb. 29, 2008; U.S. patent application Ser. No. 12/537,393, to Barefoot, et al., entitled "Strengthened Glass Articles and Methods of Making," filed Aug. 7, 2009, which claims priority to U.S. Provisional Application No. 61/087,324, entitled "Chemically Tempered Cover Glass," filed Aug. 8, 2008; U.S. Provisional Patent Application No. 61/235,767, to Barefoot, et al., entitled "Crack and Scratch Resistant Glass and Enclosures Made Therefrom," filed Aug. 21, 2009; and U.S. Provisional Patent Application No. 61/235,762, to Dejneka, et al., entitled "Zircon Compatible Glasses for Down Draw," filed Aug. 21, 2009.

The glass surfaces and sheets described in the following example(s) can be any suitable particle-coatable and etchable glass substrate or like substrates, and can include, for example, a glass composition 1 through 11, or a combination thereof, listed in Table 1.

TABLE 1

Representative glass substrate compositions.

| Oxides (mol %) | Glass | | | | | | | | | | |
|---|---|---|---|---|---|---|---|---|---|---|---|
| | 1 | 2 | 3 | 4 | 5 | 6 | 7 | 8 | 9 | 10 | 11 |
| $SiO_2$ | 66.16 | 69.49 | 63.06 | 64.89 | 63.28 | 67.64 | 66.58 | 64.49 | 66.53 | 67.19 | 70.62 |
| $Al_2O_3$ | 10.29 | 8.45 | 8.45 | 5.79 | 7.93 | 10.63 | 11.03 | 8.72 | 8.68 | 3.29 | 0.86 |
| $TiO_2$ | 0 | — | — | — | — | 0.64 | 0.66 | 0.056 | 0.004 | — | 0.089 |
| $Na_2O$ | 14 | 14.01 | 15.39 | 11.48 | 15.51 | 12.29 | 13.28 | 15.63 | 10.76 | 13.84 | 13.22 |
| $K_2O$ | 2.45 | 1.16 | 3.44 | 4.09 | 3.46 | 2.66 | 2.5 | 3.32 | 0.007 | 1.21 | 0.013 |
| $B_2O_3$ | 0.6 | — | 1.93 | — | 1.9 | — | — | 0.82 | — | 2.57 | — |
| $SnO_2$ | 0.21 | 0.185 | — | — | 0.127 | — | — | 0.028 | — | — | — |
| BaO | 0 | — | — | — | — | — | — | 0.021 | 0.01 | 0.009 | — |
| $As_2O_3$ | 0 | — | — | — | — | 0.24 | 0.27 | — | — | 0.02 | — |
| $Sb_2O_3$ | — | — | 0.07 | — | 0.015 | — | 0.038 | 0.127 | 0.08 | 0.04 | 0.013 |
| CaO | 0.58 | 0.507 | 2.41 | 0.29 | 2.48 | 0.094 | 0.07 | 2.31 | 0.05 | 7.05 | 7.74 |
| MgO | 5.7 | 6.2 | 3.2 | 11.01 | 3.2 | 5.8 | 5.56 | 2.63 | 0.014 | 4.73 | 7.43 |
| $ZrO_2$ | 0.0105 | 0.01 | 2.05 | 2.4 | 2.09 | — | — | 1.82 | 2.54 | 0.03 | 0.014 |
| $Li_2O$ | 0 | — | — | — | — | — | — | — | 11.32 | — | — |
| $Fe_2O_3$ | 0.0081 | 0.008 | 0.0083 | 0.008 | 0.0083 | 0.0099 | 0.0082 | 0.0062 | 0.0035 | 0.0042 | 0.0048 |
| SrO | — | — | — | 0.029 | — | — | — | — | — | — | — |

EXAMPLES

The following examples serve to more fully describe the manner of using the above-described disclosure, and to further set forth the best modes contemplated for carrying out various aspects of the disclosure. It is understood that these examples do not limit the scope of this disclosure, but rather are presented for illustrative purposes. The working examples further describe the methods and how to make the articles of the disclosure.

Example 1

Preparation of Particle Suspensions

This example is one exemplary procedure for accomplishing the present method. The steps of how the glass was coated, thermally treated, then etched are described below. A 2318 glass (6"×6") specimen was washed in the washer (Crest Line) using about 4% detergent the in deionized (DI) water. The washed glass sheets were then laid on a flat surface and 33.33 wt % of DEUREX ME 1519 wax particles were weighed into a container and 66.64 wt % of 2-propanol was added. DEUREX ME 1519 wax particles are available from DEUREX Micro-Technologies; Germany (www.deurex.com). The container was processed for five minutes on a Resodyn™ Acoustic Mixer at the 60% power level. The resulting particle size distribution measured by laser light scattering is shown in FIG. 8A. The concentrated suspension could be used directly without further modification or could be stored, for example, for about 1 week if continuously rolled prior to use.

Example 2

Preparation of Particulated Surfaces

Coating or Depositing Particle Suspensions

This example is an exemplary procedure for coating or depositing a wax particle suspension on the glass surface. The particle suspension of Example 1 was hand-coated onto a glass sheet using a 1 mil (25 microns) drawdown bar.

The volatile liquid or solvent was evaporated in air or with accelerated drying methods, such as vacuum, mild heating, or combinations thereof. The residual surface layer of the wax particulates partially protects underlying or supporting portions of the glass substrate surface, so that during acid etching not all of the substrate is etched away. Particulate suspension preparation can include, for example, a two step process comprising, for example, preparing a concentrate stock suspension, and then prior to surface application, the concentrate can be reduced in concentration or let-down by adding (diluting) a volatile liquid that can readily evaporate after application. In embodiments, the dilute suspension is stable for a period of, for example, several days to weeks, and can be re-suspended by rolling or shaking.

The following is an exemplary hand coating procedure.

A small amount (1 mL) of particle suspension was poured onto the glass sample. Use a 25 micrometer gap drawdown bar to sweep the poured particle suspension from one end to the other of the glass sample. A thin film with 25 micrometer wet thickness remains on the glass.

With the coated side up, the glass was placed on a hot plate set, for example, at 75° C. for 40 seconds.

After the thermal treatment, the sample was then dipped into an etchant bath containing an acid solution having a specific concentration, for example, a 5.5M HF/6.5M $H_2SO_4$ for a specific time, e.g., 30 seconds. The resulting etched sample was then removed from the acid bath and rinsed. An optional organic solvent rinse can be used if there is any wax particle mask residue. For example, acetone or like solvents, are particularly useful for removing many different types of polymer particles. The coupon was allowed to dry before measuring the haze, sparkle, and DOI, of the etched samples.

Different methods for applying the particles can be selected. For example, the particle suspension could be sprayed, curtain-coated, screen-printed, dip-coated, spin-coated, applied with a roller, rod-coated, roll-coated, and like methods, or combinations thereof. Many of the examples in the disclosure were prepared using slot-die coating method, which method has a number of production and productivity advantages. An advantage of the slot-die coating technique is that the coating thickness can be precisely controlled. After coating and thermal treatment, a very thin layer (of about only 1 to 2 layers, or in some instances less than a complete monolayer) of particles remained on the surface. This type of coating improves the ability of the acid to permeate or infiltrate the spaces in the particle coating mask, resulting in, for example, more efficient etching, less acid consumption, and less particle consumption. Further process improvements include, for example, optimizing the interaction between the particles and the glass surface by adjusting the glass or the particle properties, particle concentration, surface charge properties, or combinations thereof. In embodiments, a preferred wet coating method applies only about 1 to 2 particle layers, or even less than a monolayer to the glass surface. Table 2 shows examples of various thermal set points while keeping the thermal treatment time the same. The same acid etchant concentrations were used.

As the treatment temperature is increased, more particles fused together and have stronger adhesion on the glass surface and thus allowed the acid to etch more into the glass. This was clearly demonstrated in Table 1 when the haze level increased and the DOI became lower. When heat treated at a low temperature, the particles didn't fuse together and had poor adhesion on the glass. The particles could be easily washed off the surface or were undercut quickly by the acid. This resulted in a high DOI and low haze values.

Even with very short etch times in $HF/H_2SO_4$ solution, high to very high haze target with good DOI were achieved. The sparkle was very low and the anti-glare appearance properties were judged to be excellent by numerous observers. This clearly demonstrated that using polyethylene wax particle formulations as a masking layer gave superior optical performance.

Table 3 shows more examples of using polyethylene wax particles to create anti-glare layer on Gorilla® Glass. Samples were heat treated at different temperatures and etched for a shorter time. The results in Table 3 show that when a shorter etching time was used, the DOI went up while keeping the haze and sparkle similar. This demonstrates the flexibility and less glass thickness loss.

TABLE 2

| Particle size (microns) | Heating Temp (° C.) | Heating Time (sec) | Acid Concentration | Etch Time (sec) | DOI | Haze | Sparkle |
|---|---|---|---|---|---|---|---|
| 50% <6; | 100 | 30 | 6M HF | 30 | 65 | 7.4 | 5.9 |
| 99% <19 | 102 | | 7M $H_2SO_4$ | | 53 | 12.3 | 6.1 |
| | 104 | | | | 37 | 28.4 | 5 |
| | 106 | | | | 26 | 44 | 6.5 |
| | 108 | | | | 26 | 45.6 | |
| | 110 | | | | 26 | 58.5 | visual rating <6 |

TABLE 3

| Particle size (microns) | Heating Temp (° C.) | Heating Time (sec) | Acid Concentration | Etch Time (sec) | DOI | Haze | Sparkle |
|---|---|---|---|---|---|---|---|
| 50% <6; | 100 | 30 | 6M HF | 20 | 65 | 10 | 5.8 |
| 99% <19 | 102 | | 7M $H_2SO_4$ | | 60 | 15 | 5.6 |
| | 104 | | | | 42 | 25 | 5.2 |
| | 106 | | | | 26 | 45 | 5.9 |
| | 108 | | | | 26 | 46 | 5.9 |
| | 110 | | | | 26 | 58 | visual rating <6 |

Table 4 shows more examples of using the low molecular weight polyethylene wax particles to create anti-glare layer on Gorilla® Glass. Samples were heated at different temperatures and etched at a lower acid concentration. With lower acid concentration, high haze to very high haze was still achieved with excellent sparkle. It is expected that even lower acid concentrations can be used to achieve similar results by, for example, adjusting particle heating temperature, heating time, particle concentration, etching temperature, coating thickness, etch time, or combinations thereof.

TABLE 4

| Particle size (microns) | Heating Temp (° C.) | Heating Time (sec) | Acid Concentration | Etch Time (sec) | DOI | Haze | Sparkle |
|---|---|---|---|---|---|---|---|
| 50% <6; 99% <19 | 100 | 30 | 5.5M HF 6.5M $H_2SO_4$ | 30 | 71 | 6.8 | 5.4 |
| | 102 | | | | 70 | 7.4 | 5.2 |
| | 104 | | | | 57 | 19 | 5.4 |
| | 106 | | | | 30 | 30 | 5.6 |
| | 108 | | | | 29 | 32 | 5.3 |
| | 110 | | | | 26 | 51 | visual rating <6 |

The particles used were based on low molecular polyethylene particle, having a relatively low Tg. A wide variety of alternative polymer particles having an annealing temperature to be roughly proportional to the Tg of the polymer particles can be selected. Examples of other polymer particle materials include, for example, polystyrene, polyesters, polyolefins, polyvinylchloride, polyvinyl acetate, polyvinyl alcohol, polyacrylonitrile, silicone, polyethylene, melamine, (meth)acrylate, polyethylene terephthalate. The particles can be homopolymers, copolymers, or mixtures thereof. The beads can be modified with a surface treatment such as cross-linking, a temperature or radiation sensitive shell, and like modifications, or combinations thereof. The particles can be crosslinked or uncrosslinked, and spherical or flattened fine particles form factors comprised of a plastic can be used. Other suitable alternative materials include, for example, waxes or polymers having wax-like properties and are particularly effective in achieving the features and aspects of the disclosure. Classes of waxes can be, for example, plant, mineral, or animal-based, including petroleum derived and synthetic waxes. Some example waxes include erucamide, stearamide, oleamide, Montan, oxidized polyethylene, copolymers containing these combinations, and particles having a core of one polymer and shell of a different polymer, and other like materials. The other polymer particle types can be selected based on various considerations including cost, ease of removal, or robustness in acid solutions.

The polymer particle size need not be limited. For antiglare surfaces in display applications, a generally desirable particle size range can be, for example, from about 1 micron to about 50 microns, including intermediate values and ranges. Below this range, sub-wavelength effects can reduce the anti-glare scattering, and above this range, unacceptable display 'sparkle' can become visible in some pixelated displays. However, the disclosed process is still believed to be applicable using particle sizes outside this range. For example, the slot die coating method can be used to create a several layers of particles, and control the final glass roughness through heating of a particle mask before etching. Particles larger than 50 microns can be useful in non-display applications, such as in mouse pads or other touch input devices, anti-glare surface for non-pixelated displays, and like applications. Polymer particles less than about 1 micron can be useful for generating nano-structured surfaces, for example gradient-index anti-reflection coatings or hydrophobic or oleophobic structured surfaces. Other non-display applications that can benefit from the disclosed method is to create light-scattering surfaces on glass including photovoltaic panels for improved light trapping or light absorption, and aesthetic panels or covers for appliances or architectural applications.

Example 3

Preparation of Particulated Surfaces

DEUREX MM 8015 was slot-die coated according to the conditions listed in Table 5, where S-Gap (um) is the starting slot pour dimension in micrometers, C-Gap (um) is the coating gap slot dimension in micrometers, Horiz Del and Vert Del are time delays, and Liq Trig (mm) is the dimension when the slot-die pump shuts off at the end of the coating run. Table 6 provides etch conditions and results.

TABLE 5

| Slot Die Coating Conditions | | | | | | | | |
|---|---|---|---|---|---|---|---|---|
| Width (mm) | Aim Wet (microns) | mm/sec | ml/min | S-Gap (um) | C-Gap (um) | Horiz Del | Vert Del | Liq Trig |
| 149.225 | 13 | 50 | 5.82 | 90 | 90 | 0.1 | 0.1 | 4 |

TABLE 6

Etch data

| Particle size Distribution and Properties (microns) | Heat Temp (° C.) | Heat Treatment Time (seconds) | Acid Concentration | Etch Time (sec) | DOI | Haze | Sparkle |
|---|---|---|---|---|---|---|---|
| 50% <5 um 99% <15 um | 69 | 30 | 5.5M HF 6.5M H$_2$SO$_4$ | 30 | 27 | 42 | 5.5 |

Example 4

Preparation of Mixed Particulated Surfaces

DEUREX MM 8015 material or like materials, if desired, can be mixed with other particulate materials or other performance additives, for example, a mixture of wax particles and polymer particles. Particle suspensions were coated with same slot-die settings as above. A DUEREX particle suspension was prepared as above. A polymer particle suspension, for example, PMMA or like polymers or copolymers, such as a copolymer of methylmethacrylate and ethyleneglycoldimethacrylate, was prepared according to a formulation listed in Table 7. Alternatively, one or more of, for example, a viscosity modifier, a binder, or a dispersing agent may be omitted from the formulation.

TABLE 7

Representative polymer particle suspension formulations.

| Formulation component (wt %) | 1 | 2 | 3 |
|---|---|---|---|
| Medium 80 863 Solvent blend[1] | 11.48 | 11.48 | 11.48 |
| Ethanol | 70.86 | 70.86 | 70.86 |
| Disperbyk[2] | 0.31 | 0.31 | 0.31 |
| BYK 420[3] | 2.04 | 2.04 | 2.04 |
| Polymer particle @ 8 micrometers | 15.28 | | |
| Polymer particle @ 12 micrometers | | 15.28 | |
| Polymer particle @ 20 micrometers | | | 15.28 |
| Total | 100 | 100 | 100 |

[1]Medium 80 683 (a binder from Ferro; 8% cellulose derivative in mixed solvent; denatured ethanol, ca. 40 wt %, diethylene glycol monomethylether, ca. 60 wt %).
[2]Disperbyk, from Byk Chemie, is carboxylic acid copolymer wetting and dispersing additive. Disperbyk per se was used in these formulations.
[3]Byk 420, from Byk Chemie, is a thixotropic rheology modifier consisting of a modified urea in N-methylpyrrolidone.
4. Polymer particle is a copolymer of methylmethacrylate and ethyleneglycoldimethacrylate purchased from Sekisui Products LLC.

Other polymer particle sizes, particle compositions, mixing two or more particle sizes with same or different compositions together, or glass substrates may involve additional or further formulation manipulation to produce finished substrates having the desired roughness, haze level, and DOI properties in the finished article.

A mixed suspension was prepared by combining 90 wt % of DEUREX wax suspension with 10 wt % of the polymer particle suspension, and the mixed suspension was placed on a roller for about an hour to provide a uniform mixture. The mixture was then slot-die coated with same setting as above. Particle coated samples were then heated for 45 seconds at 75° C., and followed by chemical etching. Table 8 lists the etch conditions used and the properties of the resulting anti-glare glass. This example demonstrates that the addition of cross-linked polymer particles to the DEUREX material can provide good optical properties in the resulting anti-glare Gorilla® Glass.

TABLE 8

Mixed Particle Mask Etch Data.

| Particle size (microns) | Heat Temp (° C.) | Heat Treatment Time (sec) | Acid Concentration | Etch Time (sec) | DOI | Haze | Sparkle |
|---|---|---|---|---|---|---|---|
| 90% DEUREX 8015 and | 75 | 45 | 5.5M HF 6.1M H$_2$SO$_4$ | 30 | 40 | 25 | 63 |
| 10% PMMA[1] | 75 | | 5.5M HF 6.5M H$_2$SO$_4$ | | 43 | 30 | 6.1 |

[1]PMMA is a cross-linked polymethylmethacrylate polymer particle having an average diameter of about 5 microns.

The disclosure has been described with reference to various specific embodiments and techniques. However, it should be understood that many variations and modifications are possible while remaining within the scope of the disclosure.

What is claimed is:

1. A method of making a glass article having an anti-glare surface, comprising:
   depositing deformable particles on a portion of at least one glass surface of the article comprising contacting the glass surface with a suspension of wax particles, a suspension of polymer particles, or a combination thereof;
   deforming the deposited deformable particles on the surface by heating to adhere the particles to the glass surface;
   contacting the glass surface having the adhered particles with an etchant to form the anti-glare surface, wherein contacting comprises exposing the glass surface having the adhered particles to the etchant for about 1 second to about 30 minutes; and
   removing the adhered particles from the glass surface, wherein the glass surface comprises at least one of a soda lime silicate glass, an alkaline earth aluminosilicate glass, an alkali aluminosilicate glass, an alkali borosilicate glass, a boroaluminosilicate glass, or a combination thereof, the etchant comprises at least one acid selected from HF, H$_2$SO$_4$, or a combination thereof, and the resulting glass article has a haze of less than 30, a distinctness-of-image (DOI 20°) of 25 to 85, a surface roughness (Ra) of 50 to 500 nm, and an average roughness peak-to-valley difference profile of about 0.1 to about 10 micrometers.

2. The method of claim 1 wherein contacting the at least one glass surface with a particle suspension is accomplished with a slot coater.

3. The method of claim 1 wherein the depositing is accomplished with the particle suspension free of a binder; a rheology modifier; or a combination thereof.

4. The method of claim 1 wherein the deposited deformable particles have a $D_{50}$ diameter of from about 1 to about 30 micrometers.

5. The method of claim 1 wherein the deformable particles comprise a thermoplastic, a wax, or a combination thereof.

6. The method of claim 1 wherein the deformable particles have a glass transition temperature ($T_g$) of from about 25 to about 95° C.

7. The method of claim 1 further comprising treating the resulting roughened surface with a low-surface energy fluorinated compound coating.

8. The method of claim 1 further comprising washing the resulting anti-glare surface, chemically strengthening the anti-glare surface, or a combination thereof.

9. The method of claim 1 further comprising, prior to etching, contacting at least another surface of the article with a removable, etch-resistant protective layer.

10. The method of claim 1 wherein depositing the deformable particles on a surface of the article with a particles suspension provides ordered particles on the surface.

11. The method of claim 10 wherein the deposited deformable particles on the surface comprise a mono-layer to a multi-layer having a wet thickness of from about 1 to about 200 micrometers, and a dry thickness of from about 0.1 to about 50 micrometers.

* * * * *